US009123357B2

(12) United States Patent
Okamoto

(10) Patent No.: US 9,123,357 B2
(45) Date of Patent: Sep. 1, 2015

(54) OPTICAL PICKUP DEVICE

(71) Applicant: Funai Electric Co., Ltd., Daito-shi, Osaka (JP)

(72) Inventor: Kenji Okamoto, Daito (JP)

(73) Assignee: Funai Electronic Co., Ltd., Osaka (JP)

( * ) Notice: Subject to any disclaimer, the term of this patent is extended or adjusted under 35 U.S.C. 154(b) by 0 days.

(21) Appl. No.: 14/303,635

(22) Filed: Jun. 13, 2014

(65) Prior Publication Data
US 2014/0369175 A1 Dec. 18, 2014

(30) Foreign Application Priority Data

Jun. 18, 2013 (JP) .................................. 2013-127982

(51) Int. Cl.
G11B 7/00 (2006.01)
G11B 7/09 (2006.01)
(52) U.S. Cl.
CPC .................................... *G11B 7/0917* (2013.01)
(58) Field of Classification Search
None
See application file for complete search history.

(56) References Cited

U.S. PATENT DOCUMENTS

| 5,535,058 A * | 7/1996 | Tanaka et al. .................. 359/711 |
| 8,023,387 B2 * | 9/2011 | Nagatomi et al. ....... 369/112.01 |
| 2012/0075981 A1 * | 3/2012 | Nagatomi ................ 369/112.19 |
| 2013/0242715 A1 * | 9/2013 | Imaizumi ................. 369/112.23 |

FOREIGN PATENT DOCUMENTS

JP 2011-040123 A 2/2011

* cited by examiner

*Primary Examiner* — Brenda Bernardi
(74) *Attorney, Agent, or Firm* — Keating & Bennett, LLP

(57) ABSTRACT

An optical pickup device includes a light source configured to output laser light, an objective lens configured to converge the laser light emitted from the light source onto an optical disc, a sensor lens including a lens surface on which return light reflected by the optical disc is incident and that is also configured to generate an astigmatism in the return light, and a light-receiving element configured to receive the return light which has passed through the sensor lens 40 and to generate a focus error signal based on the received return light. The lens surface includes a first curvature radius in a first direction and a second curvature radius different from the first curvature radius in a second direction that is perpendicular or substantially perpendicular to the first direction.

19 Claims, 7 Drawing Sheets

Fig. 10

| | Curvature radius of lens surface | | Curvature radius of spherical surface [mm] | Spot diameter [μm] | Distance [mm] |
|---|---|---|---|---|---|
| | R1[mm] | R2[mm] | | | |
| Comparative example (cylindrical surface) | -2.5 ~-2.8 | | +7.0 ~+5.5 | 74 | 2.9 |
| Working example 1 (biconic surface) | -3.0 ~-4.0 | +1000 ~+200 | +7.0 ~+5.5 | 74 | |
| Working example 2 (biconic surface) | -3.0 ~-4.0 | +20.0 ~+8.8 | +7.0 ~+5.5 | 85 | |

OPTICAL PICKUP DEVICE

BACKGROUND OF THE INVENTION

1. Field of the Invention

The present invention relates to an optical pickup device configured to read information recorded on optical discs or to write information onto optical discs.

2. Description of the Related Art

Optical pickup devices for reading information recorded on optical discs or writing information onto optical discs have been known (for example, see Japanese Patent Application Laid-Open Publication No. 2011-40123). Optical pickup devices are equipped with light sources, objective lenses, sensor lenses, and light-receiving units. Laser light emitted from the light source is converged by the objective lens onto the recording plane of the optical disc. Return light reflected at the recording plane of the optical disc is given an astigmatism by the sensor lens and then received by the light-receiving unit. The light-receiving unit generates a focus error signal based on the return light it receives. Note that the focus error signal is a control signal used for focus servo control in order to match the focal position of the laser light from the objective lens to the recording plane of the optical disc.

In conventional optical pickup devices, the lens surface of the sensor lens is constituted by a cylindrical surface. Return light reflected at the recording plane of the optical disc is incident on the lens surface of the sensor lens.

In recent years, as equipment that incorporates optical pickup devices has become more compact, the need has arisen for smaller optical pickup devices. In order to make optical pickup devices smaller, distances between various components of the optical pickup device must be reduced. When the distance between the sensor lens and the light-receiving unit is reduced, the curvature radius of the lens surface of the sensor lens must be reduced in order to generate the desired focus error signal. For example, when the distance between the sensor lens and the light-receiving unit is 3.0 mm or less, the curvature radius of the lens surface of the sensor lens must be 3.0 mm or less. However, when the curvature radius of the lens surface of the sensor lens is reduced, the sensor lens is more prone to assembly discrepancies, which therefore creates the problem of the performance of optical pickup devices becoming unstable.

Note that methods are also conceivable in which the distance between the sensor lens and the light-receiving unit is reduced without changing the curvature radius of the lens surface of the sensor lens. In such cases, optical components of glass or the like must be disposed between the sensor lens and the light-receiving unit in order to increase the optical distance between the sensor lens and the light-receiving unit. However, by increasing the optical distance between the sensor lens and the light-receiving unit, the size of the spot of return light on the light-receiving unit is reduced, thus creating the problem of greater sensitivity to positional shift of the spot of return light.

SUMMARY OF THE INVENTION

Preferred embodiments of the present invention provide an optical pickup device in which a distance between the sensor lens and the light receiver is significantly reduced, a reduction in a curvature radius of a lens surface of the sensor lens is prevented, and a desired size of a spot of return light on the light receiver is secured.

An optical pickup device according to a preferred embodiment of the present invention includes a light source configured to output laser light; an objective lens configured to converge the laser light emitted from the light source onto an optical disc; a sensor lens including a lens surface on which return light reflected by the optical disc is incident or from which the return light exits and that also is configured to generate an astigmatism in the return light; and a light receiver configured to receive the return light which has passed through the sensor lens and to generate a focus error signal based on the received return light, wherein the lens surface has a first curvature radius in a first direction and a second curvature radius different from the first curvature radius in a second direction that is perpendicular or substantially perpendicular to the first direction.

Generally, when the distance between the sensor lens and the light receiver is reduced, the curvature radius of the lens surface of the sensor lens must be reduced in order to generate the desired focusing error signal. With this mode, because the lens surface of the sensor lens is a so-called a biconic surface, the first curvature radius and second curvature radius of the lens surface each help implement the reduction in curvature radius of the overall lens surface. This makes it possible to reduce the distance between the sensor lens and the light-receiving element while limiting the reduction in each of the first curvature radius and the second curvature radius. As a result, sensor lens assembly discrepancies are significantly reduced and prevented, so the performance of the optical pickup device is made stable. Furthermore, because the first curvature radius and the second curvature radius are each reduced, there is no need to dispose optical components of glass or the like between the sensor lens and the light receiver in order to increase the optical distance between the sensor lens and the light receiver. For this reason, the size of the spot of return light on the light receiver is reliably secured, and sensitivity to positional shift of the spot of return light on the light receiver is significantly reduced or minimized.

For example, in the optical pickup device according to a preferred embodiment of the present invention, the lens surface preferably is concave in the first direction and convex in the second direction.

With this preferred embodiment of the present invention, because the lens surface preferably is concave in the first direction and convex in the second direction, it is possible to limit the shape of the lens surface approaching a spherical surface and to effectively produce an astigmatism in the return light.

For example, in the optical pickup device according to another preferred embodiment of the present invention, the sensor lens preferably includes a spherical surface provided on the opposite side of the lens surface.

With this preferred embodiment of the present invention, the sensor lens also includes a spherical surface provided on the opposite side of the lens surface, so it is possible to prevent or minimize the reduction of the first curvature radius or the second curvature radius such that the first and/or second curvature radius is larger. This makes it possible to limit the shape of the lens surface approaching a spherical surface and to effectively produce an astigmatism in the return light.

For example, in the optical pickup device according to a preferred embodiment of the present invention, an optical axis of the lens surface preferably coincides with an optical axis of the spherical surface.

With this preferred embodiment of the present invention, because the optical axis of the lens surface coincides with the optical axis of the spherical surface, a stable astigmatism is reliably generated in the return light.

With the optical pickup device according to various preferred embodiments of the present invention, the distance between the sensor lens and the light receiver is significantly reduced while limiting the reduction in curvature radius of the lens surface of the sensor lens and also securing the size of the spot of return light on the light receiver.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10 is a table showing working examples and a comparative example of sensor lenses.

DETAILED DESCRIPTION OF THE PREFERRED EMBODIMENTS

An optical pickup device according to preferred embodiments will be described in detail below using drawings. Note that each of the preferred embodiments to be described below represents a preferred concrete example of the present invention. The numerical values, shapes, materials, constituent elements, the disposed positions and connection modes of the constituent elements, and so forth indicated in the preferred embodiments described below are just examples and do not limit the present invention in any way.

Figure 1:
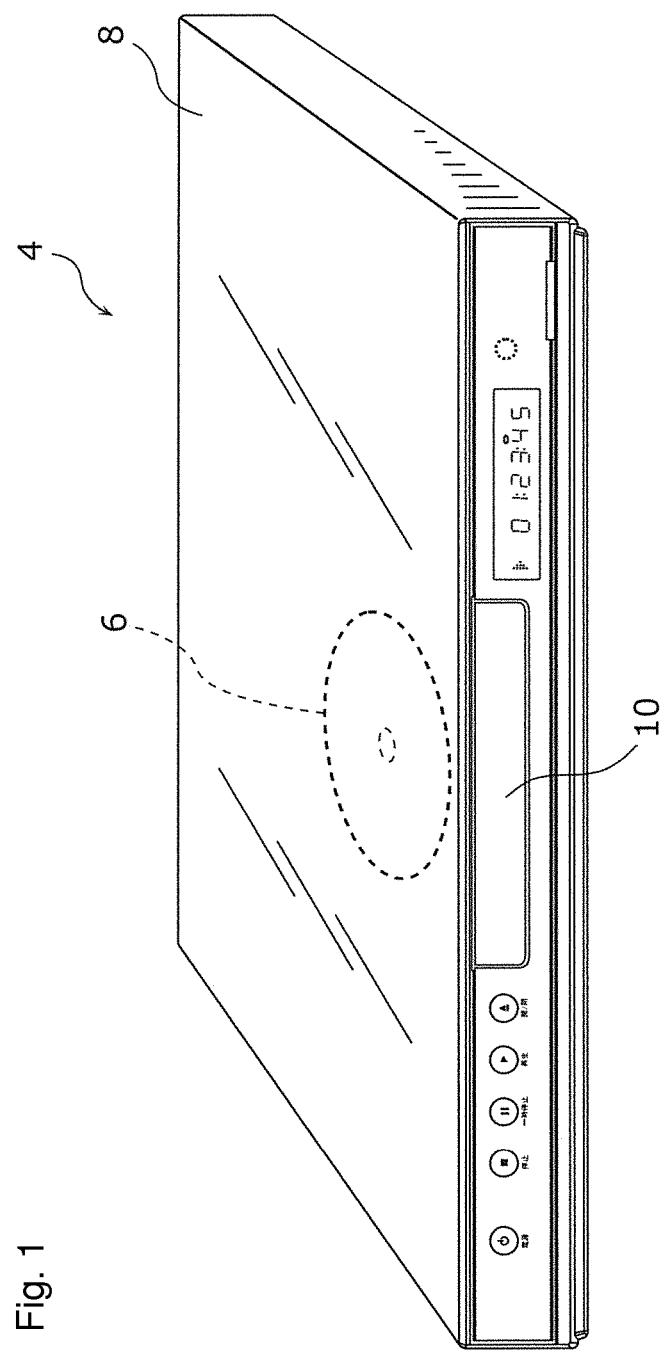
FIG. 1 is a perspective view showing the external appearance of an optical disc device in which the optical pickup device according to a preferred embodiment of the present invention is mounted.
Figure 2:
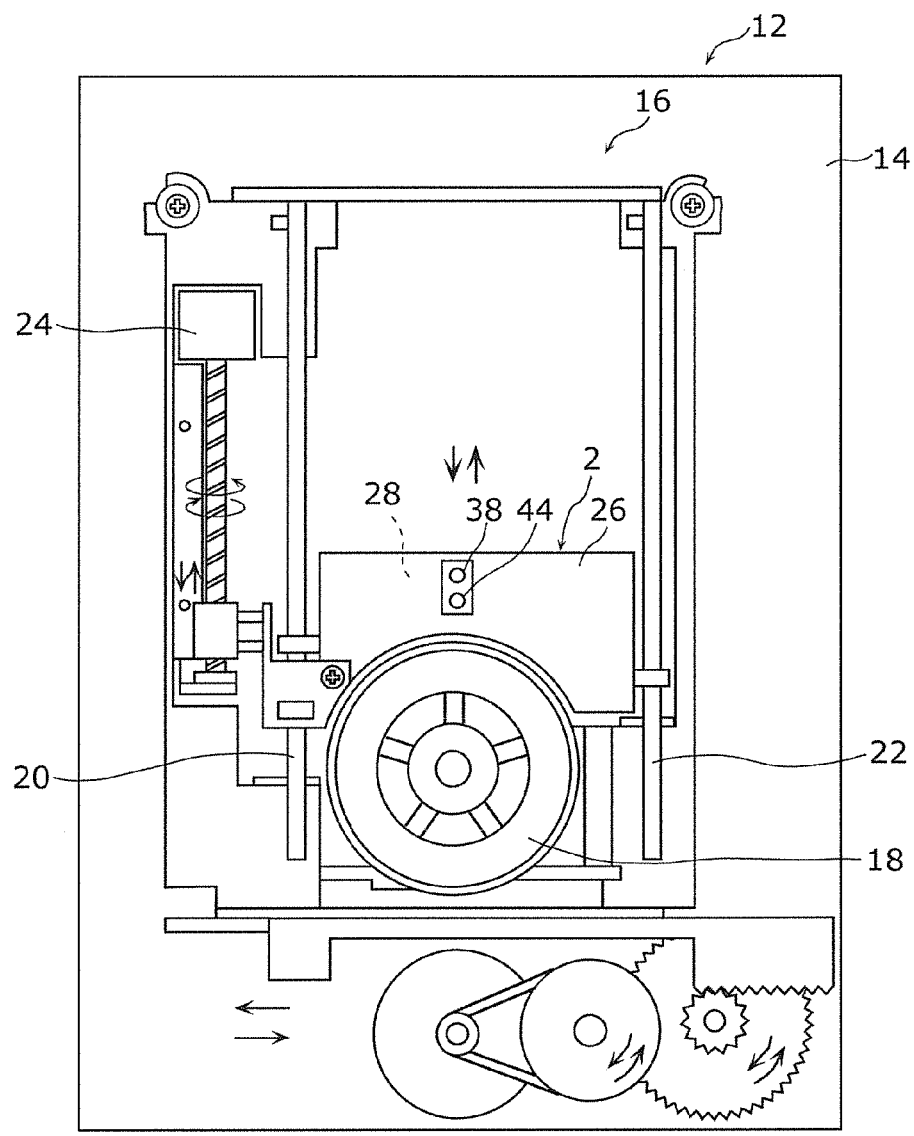
FIG. 2 is a plan view showing the loader of the optical disc device in FIG. 1.

First, a schematic configuration of an optical disc device in which the optical pickup device according to a preferred embodiment is included will be described with reference to FIGS. 1 and 2. FIG. 1 is a perspective view showing the external appearance of an optical disc device in which the optical pickup device according to a preferred embodiment is mounted. FIG. 2 is a plan view showing the loader of the optical disc device in FIG. 1.

For example, the optical pickup device 2 is included in an optical disc device 4 as shown in FIGS. 1 and 2. The optical disc device 4 preferably is a Blu-ray disc (or BD; Blu-ray is a registered trademark) recorder configured to play information recorded on an optical disc 6 and recording information on the optical disc 6. Note that the optical disc 6 is, for example, a Blu-ray disc, digital versatile disc (DVD), or compact disc (CD).

A disc tray 10 and a loader 12 disposed under the disc tray 10 are mounted in the casing 8 of the optical disc device 4.

As shown in FIG. 1, the disc tray 10 is configured to carry the optical disc 6. The disc tray 10 is able to move back and forth between a pulled-out position pulled to the outside of the casing 8 and a housed position that is housed in the interior of the casing 8 via a drive mechanism (not shown) provided in the interior of the casing 8. As a result of the disc tray 10 moving to the pulled-out position, it is possible to place the optical disc 6 on the disc tray 10 (or to remove the optical disc 6 from the disc tray 10).

As shown in FIG. 2, the loader 12 includes a loader main body 14 and a traverse member 16 which is configured such that it can be raised and lowered with respect to the loader main body 14. A spindle motor (not shown) configured to rotate a turntable 18 is attached to the traverse member 16. The turntable 18 is configured to carry the optical disc 6.

A pair of guide shafts 20 and 22 are also attached to the traverse member 16. The optical pickup device 2 configured to read information recorded on the optical disc 6 and write information to the optical disc 6 is supported on the pair of guide shafts 20 and 22 so as to be movable. A stepping motor 24 configured to drive the optical pickup device 2 is also attached to the traverse member 16. As a result of the drive force of the stepping motor 24 being transferred to the optical pickup device 2, the optical pickup device 2 moves back and forth in the radial direction of the optical disc 6 along the pair of guide shafts 20 and 22. The configuration of the optical pickup device 2 will be described below.

Figure 3:
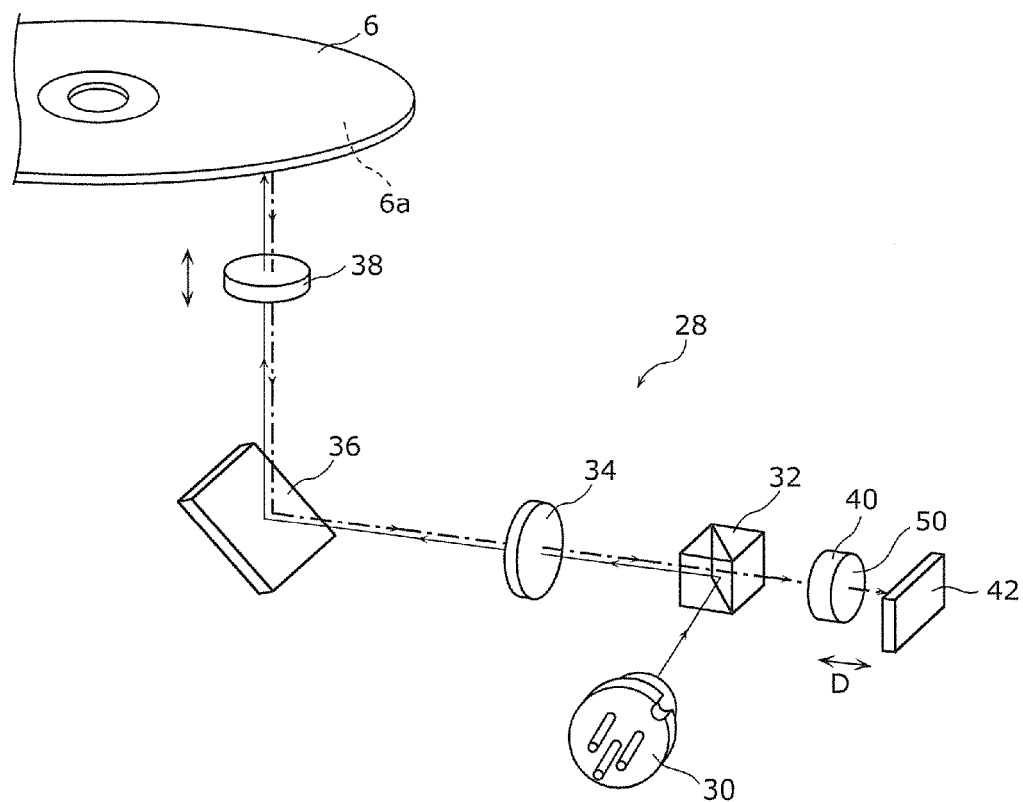
FIG. 3 is a perspective view showing the configuration of the optical pickup device according to a preferred embodiment of the present invention.
Figure 4:
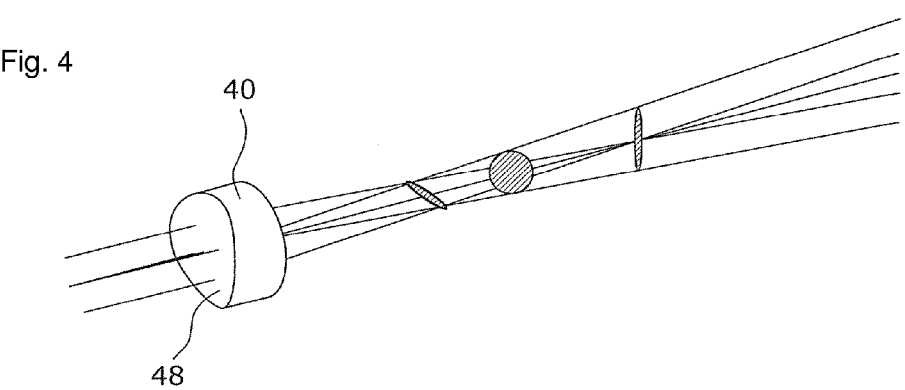
FIG. 4 is a perspective view showing in model form how an astigmatism is created in return light by the sensor lens.
Figure 5A:
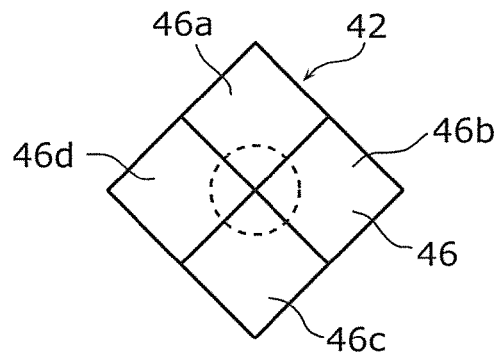
FIG. 5A is a diagram showing the light-receiving surface of a light-receiving element that has received return light.
Figure 5B:
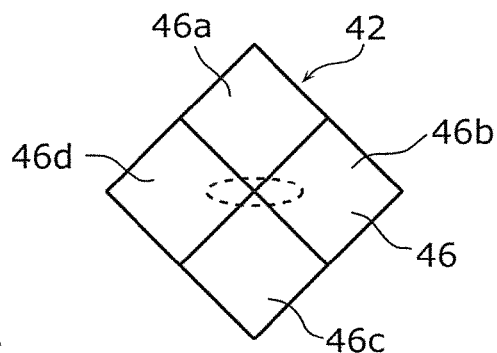
FIG. 5B is a diagram showing the light-receiving surface of a light-receiving element that has received return light.
Figure 5C:
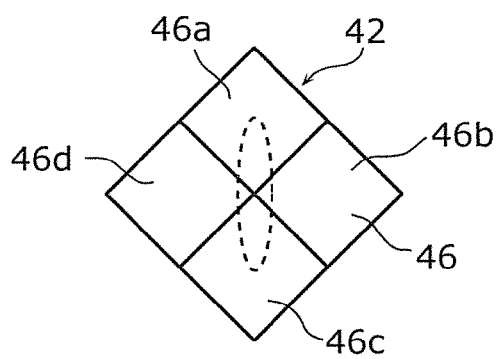
FIG. 5C is a diagram showing the light-receiving surface of a light-receiving element that has received return light.

Next, the configuration of the optical pickup device 2 will be described with reference to FIGS. 3 through 5C as well. FIG. 3 is a perspective view showing the configuration of the optical pickup device according to a preferred embodiment of the present invention. FIG. 4 is a perspective view showing in model form how an astigmatism is created in the return light by the sensor lens. Each of FIGS. 5A through 5C is a diagram showing the light-receiving surface of a light-receiving element that has received return light.

As shown in FIG. 2, the optical pickup device 2 includes a housing 26. The housing 26 houses an optical system 28 for BDs and an optical system (not shown) for DVDs and CDs. When the optical disc 6 placed on the disc tray 10 is a BD, the optical system 28 for BDs is used. When the optical disc 6 placed on the disc tray 10 is a DVD or CD, on the other hand, the optical system for DVDs and CDs is used. Note that because the optical system 28 for BDs and the optical system for DVDs and CDs have nearly the same configuration, the description below will cover only the configuration of the optical system 28 for BDs.

As shown in FIG. 3, the optical system 28 for BDs includes a light source 30, a beam splitter 32, a collimating lens 34, a rising mirror 36, an objective lens 38, a sensor lens 40, and a light-receiving element 42 (which constitutes the light receiver).

For instance, the light source 30 preferably is a laser diode that outputs laser light for BDs (for example, laser light of wavelengths in the 405 nm band).

The beam splitter 32 preferably is disposed on the optical path of the laser light emitted from the light source 30. The beam splitter 32 reflects laser light emitted from the light source 30 and also passes laser light reflected at the recording plane 6a of the optical disc 6 (hereinafter referred to as "return light").

The collimating lens 34 preferably is disposed on the optical path of the laser light reflected by the beam splitter 32. The collimating lens 34 converts the laser light reflected by the beam splitter 32 into parallel light.

The rising mirror 36 is disposed on the optical path of the laser light reflected by the beam splitter 32. The laser light converted into parallel light by the collimating lens 34 is incident on the rising mirror 36. The rising mirror 36 reflects the incident laser light in a direction perpendicular or substantially perpendicular to the recording plane 6a of the optical disc 6.

The objective lens 38 is disposed on the optical path of the laser light between the rising mirror 36 and the optical disc 6. The objective lens 38 converges the laser light reflected by the rising mirror 36 on the recording plane 6a of the optical disc 6. The objective lens 38 is exposed on the top surface of the housing 26 as shown in FIG. 2. Note that an objective lens 44 of the optical system for DVDs and CDs is also exposed on the top surface of the housing 26.

The sensor lens 40 is disposed on the optical path of the return light that has passed through the beam splitter 32. The sensor lens 40 generates an astigmatism in the return light that has passed through the beam splitter 32. This changes the shape of the return light that has passed through the sensor lens 40 so as to be a horizontally elongated elliptical shape, a circular shape, or a vertically elongated elliptical shape, for example, as shown in FIG. 4, depending on the position on the optical axis of the sensor lens 40. With the optical pickup device 2 of the present preferred embodiment, the shape of the sensor lens 40 is unique and will be described later.

The light-receiving element 42 is disposed on the optical path of the return light that has passed through the beam splitter 32. The light-receiving element 42 preferably is, for example, a photodiode that receives return light that has passed through the sensor lens 40. As shown in FIG. 5A, the light-receiving element 42 includes a light-receiving surface 46 configured to receive return light. The light-receiving surface 46 preferably is divided into four light-receiving regions 46a, 46b, 46c, and 46d, centered on the optical axis of the sensor lens 40. The light-receiving element 42 outputs the sum of the amounts of light received in the four individual light-receiving regions 46a, 46b, 46c, and 46d as a replay signal to the replay circuit (not shown).

The light-receiving element 42 also generates a focus error (FE) signal based on the return light received in each of the four light-receiving regions 46a, 46b, 46c, and 46d. When the amounts of light received in the four light-receiving regions 46a, 46b, 46c, and 46d are respectively designated as A, B, C, and D, the focus error signal is expressed as (A+C)−(B+D). The light-receiving element 42 generates the focus error signal by calculating (A+C)−(B+D).

Note that the focus error signal is used for focus servo control to match the focal position of the laser light from the objective lens 38 to the recording plane 6a of the optical disc 6. Here, focus servo control will be briefly described. When the focal position of the laser light from the objective lens 38 is matched to the recording plane 6a of the optical disc 6, the spot shape of the return light received by the light-receiving surface 46 of the light-receiving element 42 is a circular or substantially circular shape as indicated by the dashed line in FIG. 5A. At this time, the focus error signal is such that (A+C)−(B+D)=0.

When the focal position of the laser light from the objective lens 38 is shifted so as to be forward of the recording plane 6a of the optical disc 6, the spot shape of the return light received by the light-receiving surface 46 of the light-receiving element 42 is a horizontally elongated elliptical shape as indicated by the dashed line in FIG. 5B. At this time, the focus error signal is such that (A+C)−(B+D)<0.

When the focal position of the laser light from the objective lens 38 is shifted so as to be behind the recording plane 6a of the optical disc 6, the spot shape of the return light received by the light-receiving surface 46 of the light-receiving element 42 is a vertically elongated elliptical shape as indicated by the dashed line in FIG. 5C. At this time, the focus error signal is such that (A+C)−(B+D)>0.

Based on the focus error signal, focus servo control detects whether the focal position of the laser light from the objective lens 38 is shifted from the recording plane 6a of the optical disc 6. If the focal position of the laser light from the objective lens 38 is shifted from the recording plane 6a of the optical disc 6, the objective lens 38 is moved relative to the optical disc 6 by an actuator (not shown) so as to make the focus error signal such that (A+C)−(B+D)=0.

Next, the route of the laser light in the optical pickup device 2 will be described with reference to FIG. 3. In FIG. 3, the outward path of the laser light to the optical disc is indicated by a solid line, while the return path of the laser light from the optical disc 6 is indicated by a one-dot chain line.

As shown in FIG. 3, the laser light emitted from the light source 30 is reflected by the beam splitter 32 and is then incident on the collimating lens 34. The laser light converted into parallel light by the collimating lens 34 is reflected by the rising mirror 36 and is then incident on the objective lens 38. The laser light that exits from the objective lens 38 is converged on the recording plane 6a of the optical disc 6.

The return light reflected at the recording plane 6a of the optical disc 6 is converted into parallel light by the objective lens 38 and is then incident on the rising mirror 36. The return light reflected at the rising mirror 36 is converted to convergent light by the collimating lens 34 and then passes through the beam splitter 32. The return light from the beam splitter 32 passes through the sensor lens 40 and is then received by the light-receiving surface 46 of the light-receiving element 42.

Figure 6:
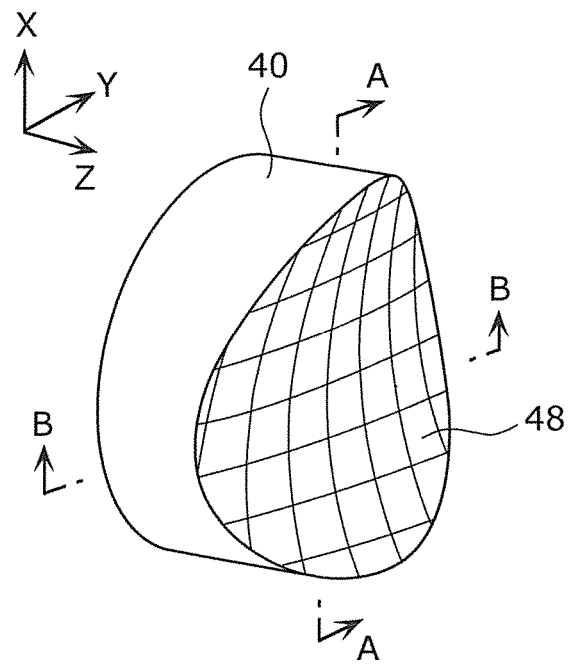
FIG. 6 is a perspective view showing the sensor lens of the pickup device a preferred embodiment of the present invention.
Figure 7:
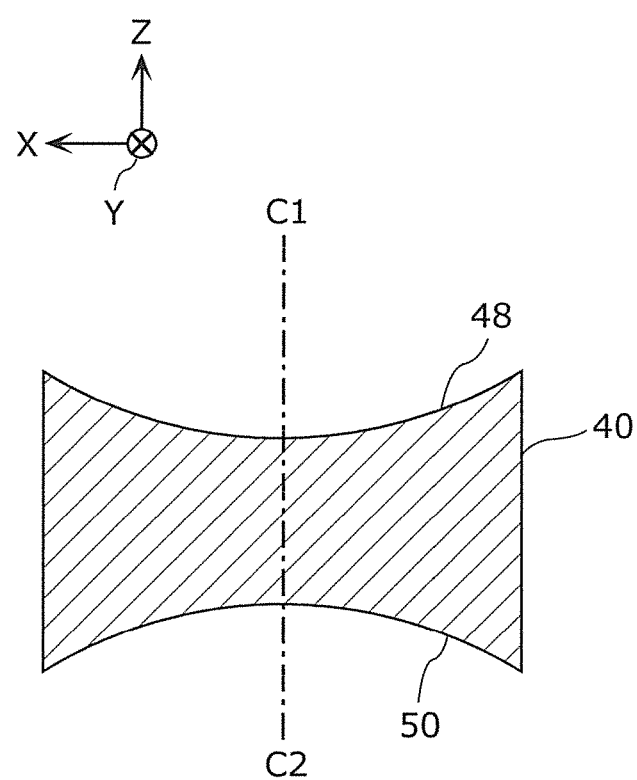
FIG. 7 is a sectional view of the sensor lens that is cut along the line A-A in FIG. 6.
Figure 8:
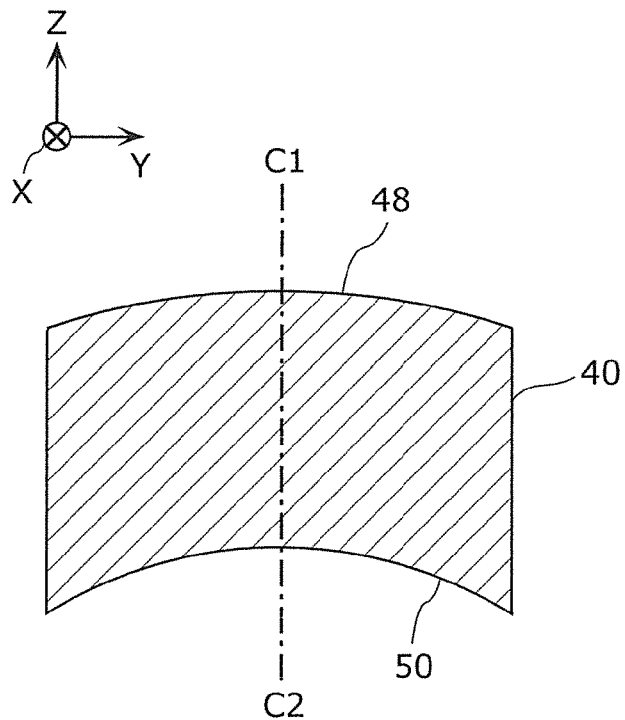
FIG. 8 is a sectional view of the sensor lens that is cut along the line B-B in FIG. 6.

Next, the shape of the sensor lens 40, which is one of the unique features of the optical pickup device 2 of the present preferred embodiment, will be described with reference to FIGS. 6 through 8. FIG. 6 is a perspective view showing the sensor lens of the pickup device according to the present preferred embodiment. FIG. 7 is a sectional view of the sensor lens that is cut along the line A-A in FIG. 6. FIG. 8 is a sectional view of the sensor lens that is cut along the line B-B in FIG. 6.

As shown in FIG. 6, the sensor lens 40 includes a lens surface 48 on which the return light that has passed through the beam splitter 32 is incident. The lens surface 48 is a so-called biconic surface which has a first curvature radius R1 in a first direction (X-axis direction) and a second curvature radius R2 in a second direction (Y-axis direction) that is perpendicular or substantially perpendicular to the first direction. The first curvature radius R1 and the second curvature radius R2 are of different sizes. As shown in FIGS. 7 and 8, the lens surface 48 preferably is concave in the first direction and convex in the second direction. For example, the first curvature radius R1 preferably is about −4.0 mm to about −3.0 mm, and the second curvature radius R2 preferably is about +8.8 to about +20.0 mm. Note that, in FIG. 6, the gridlines assigned to the lens surface 48 are lines used to express the shape of the curved surface.

As shown in FIGS. 7 and 8, the sensor lens 40 also includes a spherical surface 50 from which the return light that is incident on the lens surface 48 exits. The spherical surface is a concave surface and is provided on the side opposite from the lens surface 48. The optical axis C1 of the lens surface 48 and the optical axis C2 of the spherical surface 50 coincide. The curvature radius of the spherical surface 50 preferably is about +5.5 mm to about +7.0 mm, for example.

Next, the effects obtained by using the optical pickup device 2 of the present preferred embodiment will be described. When the distance D (see FIG. 3) between the sensor lens 40 and the light-receiving element 42 is reduced, the curvature radius of the lens surface 48 of the sensor lens 40 must be reduced in order to generate the desired focusing error signal. In the present preferred embodiment, because the lens surface 48 of the sensor lens 40 is a biconic surface, the first curvature radius R1 and the second curvature radius R2 of the lens surface 48 each help implement the reduction in curvature radius of the overall lens surface 48. This makes it possible to significantly reduce the distance D between the sensor lens 40 and the light-receiving element 42 while limiting the individual reductions of the first curvature radius R1 and the second curvature radius R2. For instance, if the first curvature radius R1 is set to about −4.0 mm to about −3.0 mm, and the second curvature radius R2 is set to about +8.8 mm to about +20.0 mm, then the distance D between the sensor lens 40 and the light-receiving element 42 can be about 3.0 mm or less. As a result, assembly discrepancies in the sensor lens 40 are significantly reduced or prevented, so the performance of the optical pickup device 2 is stable.

Figure 9:
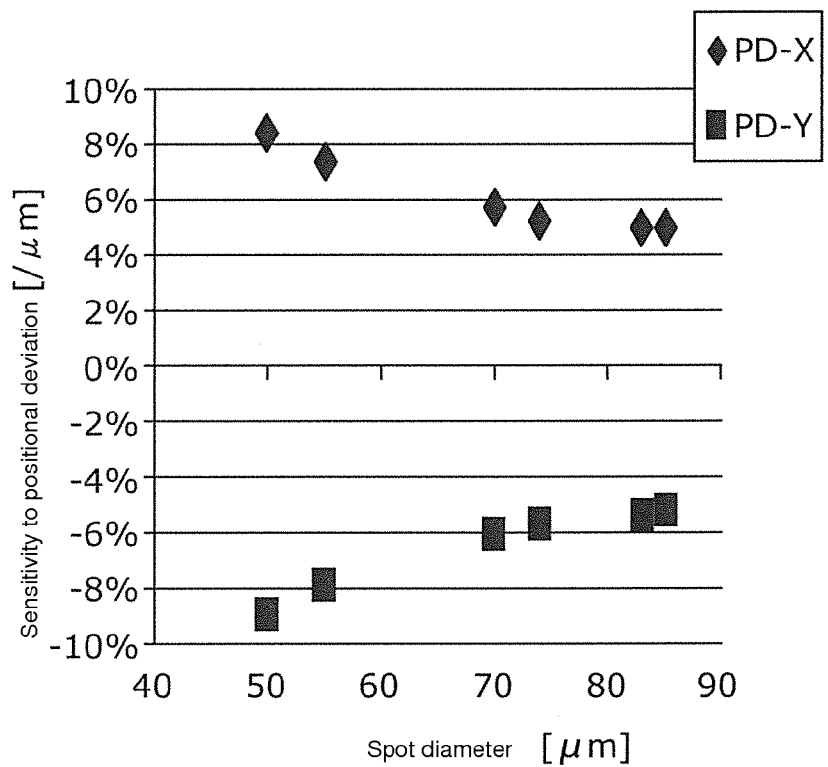
FIG. 9 is a graph showing the relationship between the diameter of the spot of return light on the light-receiving surface and the sensitivity to positional deviation.

Furthermore, because the first curvature radius R1 and the second curvature radius R2 are each significantly reduced, there is no need to dispose optical components of glass or the like between the sensor lens 40 and the light-receiving element 42. Therefore, it is possible to secure the size of the spot of return light on the light-receiving surface 46 of the light-receiving element 42. FIG. 9 is a graph showing the relationship between the diameter of the spot of return light on the light-receiving surface and the sensitivity to positional deviation. In FIG. 9, PD-X represents the sensitivity to the positional deviation of the spot in the direction in which the light-receiving region 46a and the light-receiving region 46b are disposed (to be taken as the X direction), while PD-Y represents the sensitivity to the positional deviation of the spot in the direction in which the light-receiving region 46a and the light-receiving region 46d are disposed (to be taken as the Y direction). When the amounts of light received in the four light-receiving regions 46a, 46b, 46c, and 46d are respectively designated as A, B, C, and D, PD-X and PD-Y are respectively calculated based on Equations 1 and 2 below:

$$PD\text{-}X = \{(A+D)-(B+C)\}/(A+B+C+D) \quad \text{(Equation 1)}$$

$$PD\text{-}Y = \{(A+B)-(C+D)\}/(A+B+C+D) \quad \text{(Equation 2)}$$

As shown in FIG. 9, the larger the diameter of the spot of return light on the light-receiving surface 46, the lower the sensitivity to positional deviation of the spot of return light on the light-receiving surface 46. Thus, because the size of the spot of return light on the light-receiving surface 46 is reliably secured in the present preferred embodiment, sensitivity to positional deviation of the spot of return light on the light-receiving surface 46 significantly reduced or minimized.

Moreover, because the sensor lens 40 is provided with the spherical surface 50, it is possible to alleviate or prevent the reduction of the second curvature radius R2 such that the second curvature radius is larger. As a result, it is possible to limit the shape of the lens surface 48 of the sensor lens 40 approaching a spherical surface and to effectively produce an astigmatism in the return light.

Next, the advantageous effects of the present preferred embodiment, including the effect of being able to significantly reduce the distance D between the sensor lens 40 and the light-receiving element 42 while limiting the reduction in each of the first curvature radius R1 and the second curvature radius R2 and also securing the size of the spot of return light on the light-receiving surface 46, will be described with reference to FIG. 10. FIG. 10 is a table showing working examples and a comparative example of sensor lenses.

In each of Working Examples 1 and 2, the sensor lens 40 of the preferred embodiments described above was used as the sensor lens. In the comparative example, a conventional cylindrical lens whose lens surface is a cylindrical surface was used as the sensor lens. Note that the spherical surface is provided on the opposite side of the lens surface in the sensor lens of the comparative example.

As shown in FIG. 10, with the sensor lens of the comparative example, when the distance between the sensor lens and the light-receiving element was about 2.9 mm, the curvature radius R1 of the lens surface was about −2.8 mm to about −2.5 mm. In addition, the diameter of the spot of return light on the light-receiving surface was about 74 μm.

In contrast to this, with the sensor lens of Working Example 1, when the distance between the sensor lens and the light-receiving element was about 2.9 mm, the first curvature radius R1 was about −4.0 mm to about −3.0 mm, and the second curvature radius R2 was about +200 mm to about +1000 mm, for example. Furthermore, the diameter of the spot of return light on the light-receiving surface was about 74 μm, for example.

Moreover, with the sensor lens of Working Example 2, when the distance between the sensor lens and the light-receiving element was about 2.9 mm, the first curvature radius R1 was about −4.0 mm to about −3.0 mm, and the second curvature radius R2 was about +8.8 mm to about +20.0 mm. In addition, the diameter of the spot of return light on the light-receiving surface was about 85 μm.

It can be the from the foregoing that, with the sensor lens of the preferred embodiments of the present invention, the distance between the sensor lens and the light-receiving element is significantly reduced while preventing a reduction in each of the first curvature radius R1 and the second curvature radius R2 and also securing the desired size of the spot of return light on the light-receiving surface.

An optical pickup device according to various preferred embodiments of the present invention was described above, but the present invention is not limited to the above preferred embodiments.

In the preferred embodiments of the present invention described above, the optical pickup device preferably was a Blu-ray disc recorder, but the device is not limited to this. For example, the device may be a Blu-ray disc player configured to play information recorded on an optical disc. Alternatively, the optical pickup device may be, for example, a DVD recorder, DVD player, CD player, or the like.

In the preferred embodiments of the present invention described above, the sensor lens preferably includes a spherical surface, but this spherical surface can also be omitted.

Preferred embodiments of the present invention preferably are configured such that return light is incident on the lens surface of the sensor lens, but it is also possible to have a configuration such that return light exits from the lens surface of the sensor lens. In this case, the return light that has passed through the beam splitter is incident on the spherical surface of the sensor lens and then exits from the lens surface of the sensor lens.

In preferred embodiments of the present invention, the lens surface of the sensor lens preferably is concave in the first direction and convex in the second direction, but it may also be conversely convex in the first direction and concave in the second direction. Alternatively, the lens surface of the sensor lens may be convex in both the first direction and second direction, or it may be concave in both the first direction and second direction.

The optical pickup device according to various preferred embodiments of the present invention can be included, for example, in Blu-ray disc recorders or in other optical disc devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An optical pickup device comprising:
a light source that outputs laser light;
an objective lens that converges the laser light emitted from the light source onto an optical disc;
a sensor lens including a lens surface on which return light reflected by the optical disc is incident or from which the return light exits and that generates an astigmatism in the return light; and
a light receiver that receives the return light which has passed through the sensor lens and generates a focus error signal based on the received return light; wherein
the lens surface includes a first curvature radius in a first direction and a second curvature radius different from the first curvature radius in a second direction that is perpendicular or substantially perpendicular to the first direction, and
the lens surface is concave in the first direction and convex in the second direction.

2. The optical pickup device according to claim 1, wherein the sensor lens includes a spherical surface provided on an opposite side of the lens surface.

3. The optical pickup device according to claim 2, wherein an optical axis of the lens surface coincides with an optical axis of the spherical surface.

4. The optical pickup device according to claim 1, further comprising a housing that houses a first optical system for a first type of optical disc and a second optical system for a second optical disc.

5. The optical pickup device according to claim 4, wherein one of the first and second optical systems includes the light source, a beam splitter, a collimating lens, a rising mirror, the objective lens, the sensor lens, and the light-receiving element.

6. The optical pickup device according to claim 5, wherein the sensor lens is disposed on an optical path of the return light that has passed through the beam splitter.

7. The optical pickup device according to claim 5, wherein the sensor lens generates the astigmatism in the return light that has passed through the beam splitter.

8. The optical pickup device according to claim 5, wherein the sensor lens changes a shape of the return light that has passed through the sensor lens so as to be a horizontally elongated elliptical shape, a circular shape, or a vertically elongated elliptical shape.

9. The optical pickup device according to claim 5, wherein the light receiver includes a photodiode.

10. The optical pickup device according to claim 9, wherein the light receiver includes a light-receiving surface divided into four light-receiving regions.

11. The optical pickup device according to claim 1, wherein the first curvature radius and the second curvature radius are of different sizes.

12. The optical pickup device according to claim 1, wherein the first curvature radius is about −4.0 mm to about −3.0 mm, and the second curvature radius is about +8.8 to about +20.0 mm.

13. The optical pickup device according to claim 1, wherein a distance between the sensor lens 40 and the light receiver is about 3.0 mm or less.

14. The optical pickup device according to claim 1, wherein the lens surface is convex or concave in both the first direction and the second direction.

15. The optical pickup device according to claim 1, wherein the optical disc is one of a Blu-ray disc (registered trademark), a DVD, and a CD.

16. An optical disc apparatus comprising the optical pickup device according to claim 1.

17. The optical disc apparatus according to claim 16, wherein the optical disc apparatus is one of a Blu-ray (registered trademark) recorder, a Blu-ray (registered trademark) player, a DVD recorder, a DVD player, a CD recorder, and a CD player.

18. An optical pickup device, comprising:
a light source that outputs laser light;
an objective lens that converges the laser light emitted from the light source onto an optical disc;
a sensor lens including a lens surface on which return light reflected by the optical disc is incident or from which the return light exits and that generates an astigmatism in the return light; and
a light receiver that receives the return light which has passed through the sensor lens and generates a focus error signal based on the received return light; wherein
the lens surface includes a first curvature radius in a first direction and a second curvature radius different from the first curvature radius in a second direction that is perpendicular or substantially perpendicular to the first direction, and
no element of the optical pickup device is positioned between the sensor lens and the light receiver; and
the sensor lens includes a spherical surface provided on an opposite side of the lens surface.

19. The optical pickup device according to claim 18, wherein an optical axis of the lens surface coincides with an optical axis of the spherical surface.

* * * * *